(12) United States Patent
Shiotani (10) Patent No.: US 9,210,551 B2
(45) Date of Patent: Dec. 8, 2015

(54) WIRELESS COMMUNICATION METHOD AND WIRELESS COMMUNICATION SYSTEM REQUIRING ACKNOWLEDGEMENT FRAME FROM RECEIVING SIDE

(71) Applicant: Yoshimitsu Shiotani, Kanagawa (JP)

(72) Inventor: Yoshimitsu Shiotani, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 112 days.

(21) Appl. No.: 13/804,841

(22) Filed: Mar. 14, 2013

(65) Prior Publication Data

US 2013/0250836 A1 Sep. 26, 2013

(30) Foreign Application Priority Data

Mar. 21, 2012 (JP) .................. 2012-063400

(51) Int. Cl.
*H04L 12/18* (2006.01)
*H04W 4/06* (2009.01)
(Continued)

(52) U.S. Cl.
CPC .............. *H04W 4/06* (2013.01); *H04L 1/0041* (2013.01); *H04L 1/1685* (2013.01); *H04L 1/1854* (2013.01); *H04L 12/1868* (2013.01); *H04W 72/005* (2013.01); *H04W 72/1263* (2013.01);
(Continued)

(58) Field of Classification Search
CPC ..... H04W 4/06; H04W 72/005; H04W 74/08; H04W 74/0808; H04W 74/0833; H04W 52/0216; H04W 28/04; H04W 8/186; H04W 4/08; H04W 72/121; H04W 72/0446; H04W 72/1263; H04L 1/18; H04L 1/1861; H04L 1/1607; H04L 1/1621; H04L 1/1628; H04L 5/0053; H04L 2001/0093; H04L 12/1868; H04L 1/1854; H04L 1/0041; H04L 45/00; H04L 45/16; H04L 47/14; H04L 1/1685
USPC ......... 370/311, 312, 321, 329, 338, 348, 445, 370/473; 714/748, 749, 776; 709/237
See application file for complete search history.

(56) References Cited

U.S. PATENT DOCUMENTS

2003/0103521 A1 6/2003 Raphaeli et al.
2005/0237965 A1* 10/2005 Kuperschmidt et al. ...... 370/321
(Continued)

FOREIGN PATENT DOCUMENTS

JP 2003-258813 9/2003
JP 2008-017306 1/2008
(Continued)

OTHER PUBLICATIONS

European Search Report dated May 15, 2013 in corresponding European patent application No. 13 15 9911.0.
(Continued)

*Primary Examiner* — Edan Orgad
*Assistant Examiner* — Ivan O Latorre
(74) *Attorney, Agent, or Firm* — Cooper & Dunham LLP (57) ABSTRACT

In the invention, wireless communication devices transmit beacon frames in an order in compliance with a CSMA/CA protocol. A wireless communication device as a transmitting station of a multicast frame uses one of the beacon frames to notify wireless communication devices as receiving stations of the multicast frame that an ACK frame is to be transmitted when the multicast frame is received. On receipt of the multicast frame, the wireless communication devices as the receiving stations transmit ACK frames in order of transmitting the beacon frames at SIFS intervals.

7 Claims, 8 Drawing Sheets

(51) Int. Cl.
  *H04L 1/18* (2006.01)
  *H04L 1/00* (2006.01)
  *H04W 72/12* (2009.01)
  *H04W 72/00* (2009.01)
  *H04L 1/16* (2006.01)
  *H04W 74/08* (2009.01)

(52) U.S. Cl.
  CPC ........ *H04L 2001/0093* (2013.01); *H04W 74/08* (2013.01)

(56) References Cited

U.S. PATENT DOCUMENTS

| | | | |
|---|---|---|---|
| 2006/0182188 A1* | 8/2006 | Sato | 375/259 |
| 2006/0206783 A1 | 9/2006 | Nishihara et al. | |
| 2006/0285527 A1 | 12/2006 | Gao et al. | |
| 2006/0285528 A1 | 12/2006 | Gao et al. | |
| 2008/0151852 A1* | 6/2008 | Matsue et al. | 370/338 |
| 2009/0103501 A1* | 4/2009 | Farrag et al. | 370/337 |
| 2009/0310573 A1* | 12/2009 | Sim et al. | 370/336 |
| 2011/0026472 A1* | 2/2011 | Reumerman et al. | 370/329 |
| 2012/0063394 A1 | 3/2012 | Shiotani | |

FOREIGN PATENT DOCUMENTS

| | | | | |
|---|---|---|---|---|
| JP | 4152880 | | 7/2008 | |
| JP | 4278624 | | 3/2009 | |
| JP | 4332734 | | 7/2009 | |
| JP | 2009-272731 | | 11/2009 | |
| JP | 2012-065080 | | 3/2012 | |
| WO | WO02/103943 A1 | | 12/2002 | |
| WO | WO 2011/010468 | * | 1/2011 | ............. H04L 12/56 |

OTHER PUBLICATIONS

Angeles Santos M et al., "A new ARQ mechanism for multicast traffic over IEEE 802.11 WLANS", Wireless Mobile and Networking Conference (WMNC), 2011 4th Joint IFIP, IEEE, 1-8.

Zhao Li et al., "MAC Layer Multicast Error Control for IPTV in Wireless LANs", IEEE Transactions on Broadcasting, IEEE Service Center, vol. 55, No. 2, 2009, 353-362.

Zhao Li et al., "HLBP: A Hybrid Leader Based Protocol for MAC Layer Multicast Error Control in Wireless LANs", Global Telecommunications Conference, IEEE GLOBECOM 2008, p. 1-6.

* cited by examiner

WIRELESS COMMUNICATION METHOD AND WIRELESS COMMUNICATION SYSTEM REQUIRING ACKNOWLEDGEMENT FRAME FROM RECEIVING SIDE

CROSS-REFERENCE TO RELATED APPLICATIONS

The present application claims priority to and incorporates by reference the entire contents of Japanese Patent Application No. 2012-063400 filed in Japan on Mar. 21, 2012.

BACKGROUND OF THE INVENTION

1. Field of the Invention

The present invention relates to a wireless communication method and a wireless communication system that perform a multicast transfer in a wireless communication network that communicates through the time division multiple access (TDMA) scheme.

2. Description of the Related Art

Lately, many of wired networks have been replaced by wireless networks, indicating a more and more increasing need expected for wireless communication techniques in the future. The rapidly improved wireless communication speed has enabled wireless communication of data involving a large volume and a real-time requirement, such as moving image and voice data. Increasingly common situations are therefore building home-based wireless networks that connect electronic devices at home over wireless networks and communicating wirelessly with a plurality of notebook personal computers (PCs) and projectors at corporate conference rooms.

In wireless communication networks including a plurality of wireless communication devices, a receiving station, on normally receiving a data frame, typically transmits an acknowledgment (ACK) frame to a transmitting station. Having received the ACK frame, the transmitting station determines that the data frame has been normally transmitted, thus completing transmission of the data frame. If not receiving the ACK frame within a predetermined period of time, the transmitting station determines that the data frame has not been transmitted normally and retransmits the data frame to receive the ACK frame, or repeats retransmission until a prescribed number of retransmissions is reached. This technique is called an automatic repeat request (ARQ) and improves reliability of wireless communication. Another technique is to repeat the retransmission until a lifetime period of the data frame expires.

In commonly established wireless communication standards, however, the ARQ technique is used only in unicast communication that involves only one transmitting station and one receiving station. The ARQ technique is not applied to multicast communication involving a plurality of receiving stations. The multicast communication is expected to be employed in a case in which a handout is to be transmitted simultaneously to a plurality of notebook PCs in a conference room or a case in which a presentation file is to be transmitted simultaneously from a notebook PC to a plurality of projectors, for example. The transmitting station is, however, unable to determine whether all of the receiving stations have received data normally.

Various techniques have been developed to solve the foregoing problem. Specifically, Japanese Patent No. 4152880, for example, discloses a method in which, in order to enhance reliability in multicast transfer, a multicast frame is transmitted after a bandwidth is acquired through transmission of a request-to-send (RTS) frame, a list of IDs of devices that transmit an ACK frame is set in the multicast frame, and wireless communication devices set in the list transmit the ACK frame.

Japanese Patent Application Laid-open No. 2008-17306 discloses another wireless communication method in which, in order to enhance reliability in multicast transfer, an ACK frame transmission time for a multicast frame is previously established and, when the specified time arrives, a wireless communication device that has received the multicast frame transmits ACK frames for all multicast frames received at once.

SUMMARY OF THE INVENTION

It is an object of the present invention to at least partially solve the problems in the conventional technology.

In consideration of the conventional technology mentioned above, there is needed to enhance reliability in multicast transfer without allowing throughput to be reduced in a wireless communication network including a plurality of wireless communication devices.

According to the present invention, there is provided: a wireless communication method with which a wireless communication device on a transmitting side transmits a multicast frame to a plurality of wireless communication devices on a receiving side in a wireless communication network including a plurality of wireless communication devices.

In the wireless communication method mentioned above, the wireless communication method comprises: a beacon frame transmitting step of transmitting a beacon frame by each of the wireless communication devices in sequence; a multicast frame transmitting step of transmitting the multicast frame by the wireless communication device on the transmitting side; and an acknowledgment frame transmitting step of transmitting an acknowledgment frame by a wireless communication device on the receiving side that receives the multicast frame in order of transmitting the beacon frame, wherein at the beacon frame transmitting step, the wireless communication device on the transmitting side requests, using the beacon frame, the wireless communication devices on the receiving side to transmit the acknowledgment frame.

The present invention also provides a wireless communication system comprising: a plurality of wireless communication devices, the wireless communication devices including a wireless communication device on a transmitting side and a plurality of wireless communication device on a receiving side, the wireless communication device on the transmitting side being capable of transmitting a multicast frame to the wireless communication devices on the receiving side, wherein each of the wireless communication devices includes a unit that transmits a beacon frame and a unit that acquires information indicative of an order in which the beacon frames are transmitted, the wireless communication device on the transmitting side includes a unit that transmits the multicast frame, the wireless communication devices on the receiving side each include a unit that transmits an acknowledgment frame when the multicast frame is received in the order in which the beacon frames are transmitted, and the wireless communication device on the transmitting side uses the beacon frame to request the wireless communication devices on the receiving side to transmit the acknowledgment frame.

The above and other objects, features, advantages and technical and industrial significance of this invention will be better understood by reading the following detailed descrip-

DETAILED DESCRIPTION OF THE PREFERRED EMBODIMENTS

Embodiments of the present invention will be described below with reference to the accompanying drawings.

First Embodiment

Configuration of Wireless Communication System

Figure 1:
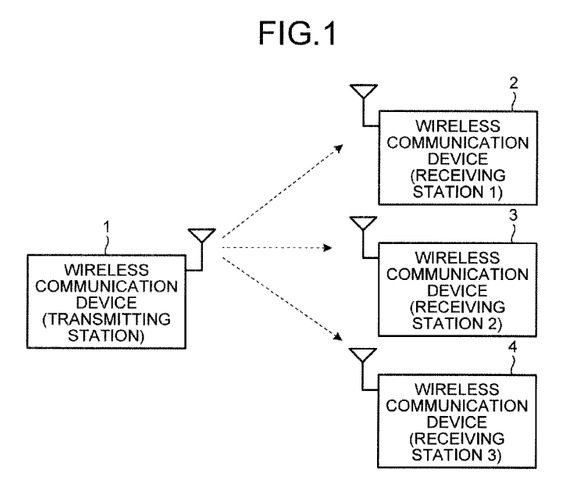
FIG. 1 is a diagram illustrating a configuration of a wireless communication system according to a first embodiment of the present invention.

FIG. 1 illustrates a configuration of a wireless communication system according to a first embodiment of the present invention.

The wireless communication system includes one wireless communication device 1 that serves as a transmitting station (transmitting side) and three wireless communication devices 2, 3, 4 that serve as receiving stations (receiving side). FIG. 1 further illustrates that the wireless communication device 1 transfers multicast frames to the wireless communication devices 2, 3, 4 through multicast transfer.

Configuration of Wireless Communication Device

Figure 2:
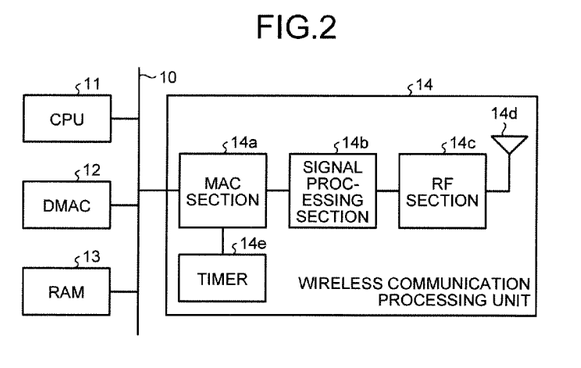
FIG. 2 is a block diagram illustrating a wireless communication device illustrated in FIG. 1.

FIG. 2 is a block diagram illustrating the wireless communication device illustrated in FIG. 1. The wireless communication devices in FIG. 1 are structured similarly to each other, each being capable of serving as a transmitting station or a receiving station. The wireless communication device illustrated in FIG. 2 is exemplary and may be configured differently as long as functions of the present invention can be achieved.

As illustrated in FIG. 2, the wireless communication device includes a central processing unit (CPU) 11, a direct memory access controller or a DMA controller (DMAC) 12, a random access memory (RAM) 13, and a wireless communication processing unit 14, all being connected to each other via a data transfer bus 10.

The wireless communication processing unit 14 includes a media access control (MAC) section 14a, a signal processing section 14b connected to the MAC section 14a, a radio frequency (RF) section 14c connected to the signal processing section 14b, an antenna 14d connected to the RF section 14c, and a timer 14e connected to the MAC section 14a.

The RAM 13 stores therein a computer program to be executed by the CPU 11 or DMA transfer data to be transferred by the DMAC 12. The DMAC 12 performs DMA transfer between the RAM 13 and the MAC section 14a of the wireless communication processing unit 14. The MAC section 14a performs wireless communication protocol control. The signal processing section 14b modulates and demodulates a transmitting/receiving frame. The RF section 14c converts a transmitting frame to a radio wave and transmits the radio wave from the antenna 14d. The RF section 14c further derives a receiving frame from a radio wave received by the antenna 14d. The timer 14e sets timing to transmit or receive a frame and generates information indicative of a time at which an ACK frame is to be transmitted for a multicast frame.

Beacon Frame Format

Figure 3:
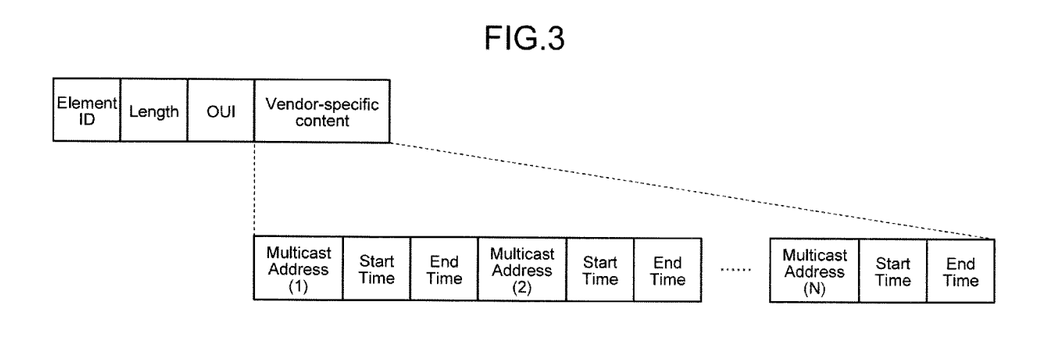
FIG. 3 is a diagram illustrating an exemplary format of a unique IE set in a beacon frame by the wireless communication device illustrated in FIG. 1.

FIG. 3 illustrates an exemplary format of a unique IE set in a beacon frame by the wireless communication device 1 illustrated in FIG. 1. The beacon frame is to be transmitted before the multicast frame is transmitted. It is noted that this format is only exemplary and any format will do as long as such a format achieves the similar function.

This format is a vendor specific IE for use in communications performed by a wireless LAN established by the IEEE802.11 Standard. As illustrated in FIG. 3, the format includes an element ID field, a length field, an organization unique identifier (OUI) field, and a vendor specific content field. A multicast address, and a start time and an end time of a multicast transfer are set in the vendor specific content field. The format indicates that the multicast transfer using the multicast address set therein is to be performed for a period of time between the start time and the end time.

Multicast Transfer

Figure 4:
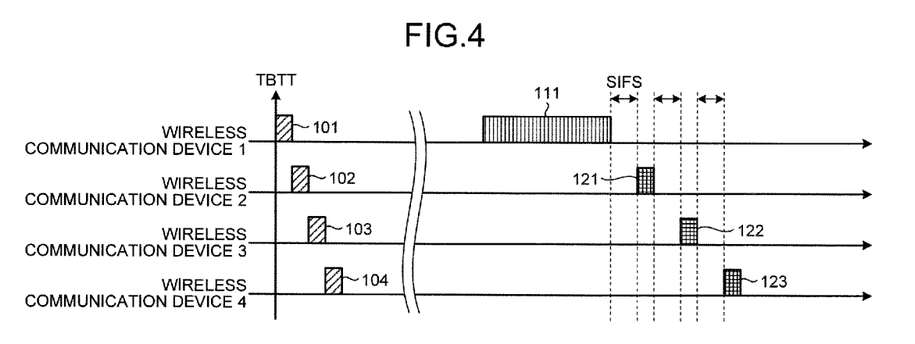
FIG. 4 is a timing chart illustrating an exemplary multicast transfer that uses an ACK frame for frame reception acknowledgement in the wireless communication system according to the first embodiment of the present invention.

FIG. 4 is a timing chart illustrating an exemplary multicast transfer that uses an ACK frame for frame reception acknowledgement in the wireless communication system according to the first embodiment.

The wireless communication device 1 as a transmitting station of a multicast frame transmits a beacon frame 101 including the IE illustrated in FIG. 3 before transmitting the multicast frame, thereby notifying the wireless communication devices 2, 3, 4 as receiving stations that constitute a multicast group to transmit an ACK frame when the multicast frame is received.

In the wireless communication system according to the first embodiment, the wireless communication devices 1, 2, 3, 4 operate in ad-hoc mode of the wireless LAN, performing communication using a carrier sense multiple access with collision avoidance (CSMA/CA) protocol.

In the CSMA/CA protocol, when a packet to be transmitted occurs, the wireless communication device checks the status of a wireless channel through carrier sense. If the wireless channel is busy as found through the carrier sense, the wireless communication device waits until the wireless channel is idle. When the wireless channel thereafter remains idle for a period of a distributed inter frame space (DIFS), the wireless communication device starts counting down a backoff time TB. After the lapse of the backoff time TB, the wireless communication device transmits the packet. If the wireless channel becomes busy during the backoff time TB, the counting of the backoff time TB is temporarily halted. The wireless channel is then checked for idle state again and, after the idle state continues for the DIFS period, the counting of the backoff time TB is restarted. Any value is set for the backoff time TB.

When target beacon transmission time (TBTT) starts, each of the wireless communication devices 1, 2, 3, 4 illustrated in FIG. 1 performs the carrier sense through the above-described procedure and transmits a beacon frame when the carrier is not sensed. In FIG. 4, the wireless communication devices 1, 2, 3, 4 transmit the beacon frames 101, 102, 103, 104, respectively, in this order.

When the transmission of the beacon frames 102, 103, 104 from other wireless communication devices 2, 3, 4 is completed, the wireless communication device 1 as the transmitting station transmits a multicast frame 111 at predetermined timing. A value of duration of a MAC header in the multicast frame 111 is a period of time during which all of the wireless communication devices 2, 3, 4 complete transmitting the ACK frames.

When receiving the multicast frame 111, the wireless communication devices 2, 3, 4 as the receiving stations transmit ACK frames 121, 122, 123, respectively, at intervals of a short inter frame space (SIFS). The ACK frames are transmitted in the order in which the beacon frames are transmitted, specifically, in the order of the wireless communication devices 2, 3, 4. It is to be noted that each of the wireless communication devices retains in the RAM 13 information that indicates a first specific time of day at which a local device transmits the beacon frame after the start of TBTT and information that indicates a second specific time of day at which a beacon frame is received from another wireless communication device before and after the first specific time of day, so that the CPU 11 can acquire information that indicates the order in which the local device transmits the beacon frame based on the information on the specific times of day.

Frame Retransmission

Figure 5:
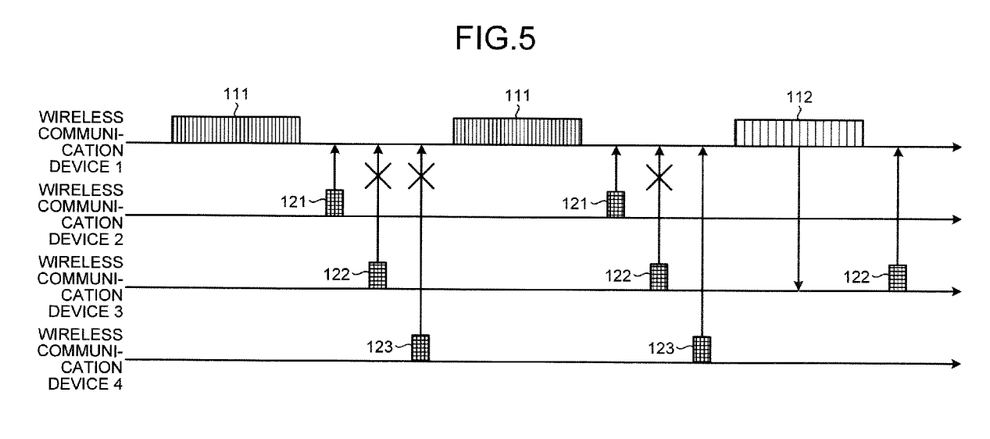
FIG. 5 is a timing chart illustrating an exemplary method for retransmitting a multicast frame in the wireless communication system according to the first embodiment of the present invention.

A method for retransmitting the multicast frame will be described below. FIG. 5 is a timing chart illustrating an exemplary method for retransmitting the multicast frame in the wireless communication system according to the first embodiment of the present invention. In FIG. 5, like or corresponding elements are identified by the same reference numerals as those used in FIG. 4.

During the first multicast transfer, the wireless communication device 1 receives the ACK frame 121 only from the wireless communication device 2 out of the wireless communication devices 2, 3, 4 and thus determines that the transmission to the wireless communication devices 3, 4 has failed.

Retransmission to the plurality of wireless communication devices 3, 4 is necessary and the multicast frame 111 is retransmitted with a retry bit of the MAC header set to "1". During the second multicast transfer, the wireless communication device 1 has received the ACK frames 121, 123 from the wireless communication devices 2, 4; however, the wireless communication device 1 this time ignores the ACK frame 121 from the wireless communication device 2 because the ACK frame 121 has already been received during the first multicast transfer.

Because the wireless communication device 1 has received no ACK frame 122 from the wireless communication device 3 again this time, the wireless communication device 1 determines that retransmission to the wireless communication device 3 is necessary. Because the next retransmission is necessary only to the wireless communication device 3, the wireless communication device 1 transmits a unicast frame 112 to the wireless communication device 3.

In the third transfer, because the wireless communication device 1 has received the ACK frame 122 from the wireless communication device 3, the wireless communication device 1 terminates the series of multicast transfer. The number of retransmissions may be set variously, such as one until a lifetime period of a transmitting frame expires and until a prescribed number of times is reached.

Multicast Transfer Involving a Wireless Communication Device in Sleep State

Figure 6:
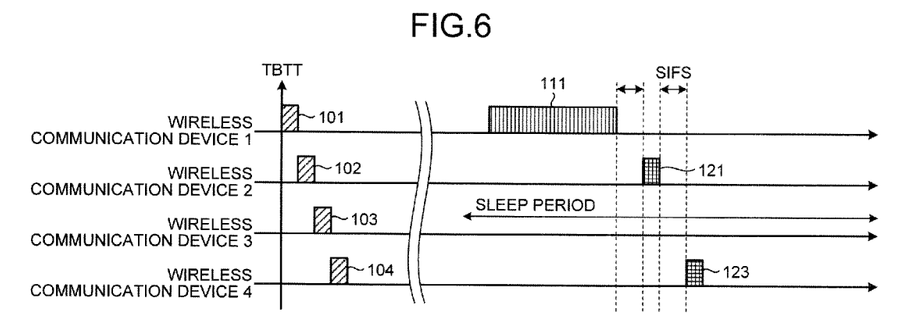
FIG. 6 is a timing chart illustrating an exemplary multicast transfer in which a wireless communication device in a multicast group enters a sleep state before the start of the multicast transfer in the wireless communication system according to the first embodiment of the present invention.

FIG. 6 is a timing chart illustrating an exemplary multicast transfer in which a wireless communication device in a multicast group enters the sleep state before the start of the multicast transfer in the wireless communication system according to the first embodiment. In FIG. 6, like or corresponding elements are identified by the same reference numerals as those used in FIG. 4.

As illustrated in FIG. 6, the wireless communication devices 1, 2, 3, 4 transmit the beacon frames 101, 102, 103, 104, respectively, in this order. As described earlier with reference to FIG. 4, the wireless communication device 1 transmits the beacon frame 101 to notify the wireless communication devices 2, 3, 4 to transmit an ACK frame when the multicast frame is received. In addition, because the wireless communication device 3 enters the sleep state before the wireless communication device 1 transmits the multicast frame 111, the wireless communication device 3 notifies the wireless communication devices 1, 2, 4 of this fact using the beacon frame 103.

The wireless communication devices 2, 4, having received the multicast frame 111, transmit the ACK frames 121, 123, respectively, at the SIFS intervals. At this time, the original order in which the wireless communication device 4 transmits the ACK frame 123 is the same as the order in which the beacon frame is transmitted, specifically, next to the wireless communication device 3. The wireless communication device 3 is, however, in the sleep state before the wireless communication device 1 transmits the multicast frame 111 and accordingly does not transmit the ACK frame. The wireless communication device 4 therefore transmits the ACK frame 123 before the wireless communication device 3.

As described heretofore, in the wireless communication system according to the first embodiment of the present invention, immediately following the receipt of the multicast frame, the wireless communication devices on the receiving side transmit the ACK frames at the SIFS intervals in the order of transmitting the beacon frames. As compared with the conventional method in which, for example, timing to transmit the ACK frame for the multicast frame is determined in advance, the wireless communication device on the transmitting side can promptly determine whether the transmission of the multicast frame has been successful and terminate the multicast transmission.

In addition, the wireless communication system according to the first embodiment uses the beacon frame to request the wireless communication device that has received the multicast frame to transmit the ACK frame. This enables the wireless communication device on the transmitting side to request the wireless communication device on the receiving side to transmit the ACK frame without allowing throughput of the wireless communication system to be reduced.

Second Embodiment

The following describes a wireless communication system according to a second embodiment of the present invention. A configuration of the wireless communication system according to the second embodiment and a block configuration of a wireless communication device are the same as those in the first embodiment (FIGS. 1 and 2). The wireless communication system according to the second embodiment differs from the wireless communication system according to the first embodiment mainly in that ultra wide band communication is used instead of the wireless LAN. The second embodiment will therefore be described with particular emphasis on this difference.

Beacon Frame Format

Figure 7:
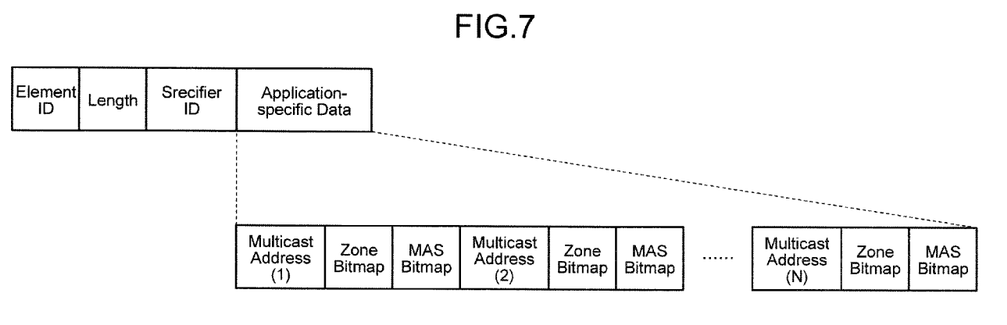
FIG. 7 is a diagram illustrating an exemplary format of a unique IE set in a beacon frame by a wireless communication device in a wireless communication system according to a second embodiment of the present invention.

FIG. 7 illustrates an exemplary format of a unique IE set in a beacon frame by a wireless communication device 1 in the second embodiment. The beacon frame is to be transmitted before the multicast frame is transmitted. It is noted that this format is only exemplary and any format will do as long as such a format achieves the similar function.

This format is an application specific information element (ASIE) for use in performing wireless communications in compliance with WiMedia-MAC or the European Computer Manufacturers Association (ECMA) standard. Here, WiMedia-MAC is a MAC protocol standardized by the WiMedia Alliance and the ECMA standard is a MAC protocol with enhanced functions based on WiMedia-MAC and standardized by the ECMA International jointly with the WiMedia Alliance.

This format includes an element ID field, a length field, a specifier ID field, and an application specific data field. A plurality of combinations can be set in the application specific data field, each combination including a multicast address, a zone bitmap value, and a media access slot (MAS) bitmap value. The format indicates that the multicast transfer using the multicast address set therein is to be performed in a time slot specified by the zone bitmap value and the MAS bitmap value.

Multicast Transfer

Figure 8:
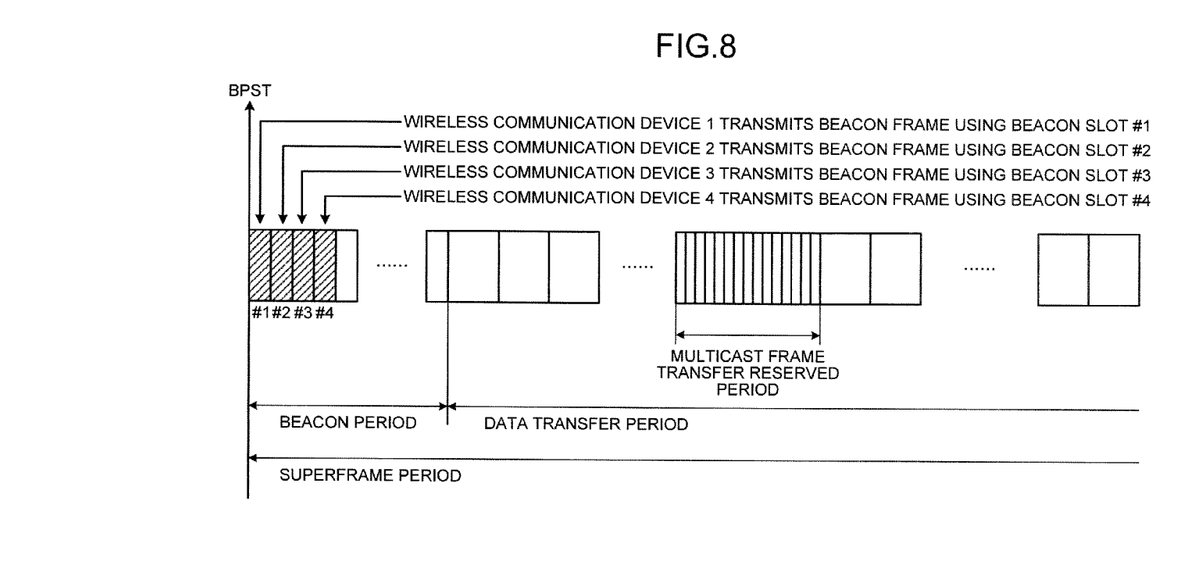
FIG. 8 is a timing chart illustrating an exemplary multicast transfer that uses an ACK frame for frame reception acknowledgement in the wireless communication system according to the second embodiment of the present invention.

FIG. 8 is a timing chart illustrating an exemplary multicast transfer that uses an ACK frame for frame reception acknowledgement in the wireless communication system according to the second embodiment of the present invention.

In WiMedia-MAC, a predetermined period is defined as one superframe period that includes a beacon period and a data transfer period following the beacon period. A time slot is allocated to the beacon period and the data transfer period for use by each of the wireless communication devices that participate in a wireless communication network, so that a beacon frame and a data frame can be transmitted. The time slot is allocated by, for example, the wireless communication device that first participates in the wireless communication network. In the second embodiment, the wireless communication device 1 that assumes the transmitting station is to allocate the time slot.

In the second embodiment, the wireless communication device 1 as the transmitting station of a multicast frame transmits a beacon frame including the IE illustrated in FIG. 7 before transmitting the multicast frame, thereby notifying wireless communication devices 2, 3, 4 as receiving stations that constitute a multicast group to transmit an ACK frame when the multicast frame is received.

As illustrated in FIG. 8, when a beacon period start time (BPST) that indicates the start of a superframe arrives, the wireless communication devices 1, 2, 3, 4 transmit beacon frames using beacon slots #1, #2, #3, #4, respectively, and the wireless communication device 1 transmits the multicast frame during a time slot period (multicast frame transfer reserved period) specified with the beacon frame.

Figure 9:
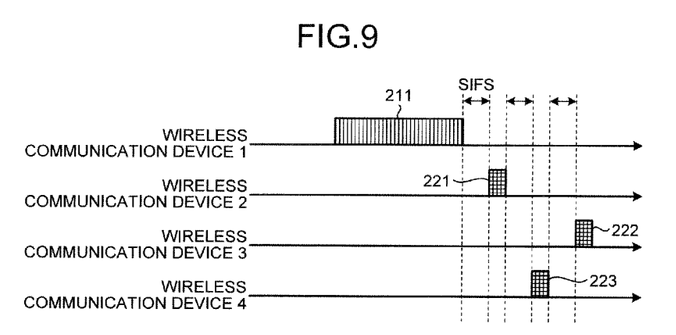
FIG. 9 is a timing chart illustrating an exemplary relationship between a multicast frame and an ACK frame in the wireless communication system according to the second embodiment of the present invention.

FIG. 9 is a timing chart illustrating an exemplary relationship between the multicast frame and the ACK frame. As illustrated in FIG. 9, the wireless communication device 1 transmits a multicast frame 211. On receipt of the multicast frame 211, the wireless communication devices 2, 3, 4 transmit ACK frames 221, 222, 223, respectively, in ascending order of the beacon slot numbers, specifically, in the order of the wireless communication devices 2, 4, 3 at SIFS intervals.

As described heretofore, in the wireless communication system according to the second embodiment of the present invention, as in the wireless communication system according to the first embodiment, immediately following the receipt of the multicast frame, the wireless communication devices on the receiving side transmit the ACK frames at the SIFS intervals in the order of transmitting the beacon frames. As compared with the conventional method in which, for example, timing to transmit the ACK frame for the multicast frame is determined in advance, the wireless communication device on the transmitting side can promptly determine whether the transmission of the multicast frame has been successful and terminate the multicast transmission.

In addition, the wireless communication system according to the second embodiment uses the beacon frame to request the wireless communication device that has received the multicast frame to transmit the ACK frame. This enables the wireless communication device on the transmitting side to request the wireless communication device on the receiving side to transmit the ACK frame without allowing throughput of the wireless communication system to be reduced.

It should be noted that the first embodiment has been described for the wireless communication system that performs communication using the wireless LAN that complies with the IEEE802.11 standard, while the second embodiment has been described for the wireless communication system that performs communication through WiMedia-MAC. The present invention may nonetheless be applicable to a wireless communication system that is compatible with both standards and is operable through manual or automatic switching therebetween.

The present invention can enhance reliability in multicast transfer in a wireless communication network that includes a plurality of wireless communication devices without reducing throughput.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wireless communication method with which a wireless communication device on a transmitting side transmits a multicast frame to a plurality of wireless communication devices on a receiving side in a wireless communication network including a plurality of wireless communication devices, the wireless communication method comprising:
    (a) transmitting a beacon frame by the wireless communication device on the transmitting side, wherein the wireless communication device on the transmitting side requests, using the beacon frame, the wireless communication devices on the receiving side to transmit an acknowledgment frame;
    (b) receiving, from each receiving side device amongst the plurality of wireless communication devices in sequence, a beacon frame transmitted by the receiving side device;
    (c) transmitting the multicast frame by the wireless communication device on the transmitting side; and
    (d) receiving by the wireless communication device on the transmitting side acknowledgment frames transmitted by respective receiving-side devices, amongst the wireless communication devices on the receiving side, that receive the multicast frame, in an order that the beacon frame was received by the receiving side devices, the acknowledgement frames having been transmitted from the receiving-side devices a predetermined interval after an end of the multicast frame and with the predetermined interval between adjacent acknowledgement frames.

2. The wireless communication method according to claim 1, wherein each of the wireless communication devices transmits the beacon frame at random timing.

3. The wireless communication method according to claim 1, further comprising:
    a step of determining the order in which the beacon frame is transmitted by one of the wireless communication devices.

4. The wireless communication method according to claim 1, further comprising:
    a frame retransmitting step of retransmitting the multicast frame by the wireless communication device on the transmitting side to each of the wireless communication devices on the receiving side when the wireless communication device on the transmitting side fails to receive the acknowledgment frames from the wireless communication devices on the receiving side.

5. The wireless communication method according to claim 1, further comprising:
    a frame retransmitting step of retransmitting a unicast frame by the wireless communication device on the transmitting side to a single specific wireless communication device on the receiving side when the wireless communication device on the transmitting side fails to receive the acknowledgment frame from the specific wireless communication device on the receiving side.

6. The wireless communication method according to claim 1, wherein a specific wireless communication device in a sleep state on the receiving side uses the beacon frame to notify other wireless communication devices that the specific wireless communication device is in the sleep state and the wireless communication devices on the receiving side that are notified that the specific wireless communication device is in the sleep state skip the specific wireless communication device in the sleep state when transmitting the acknowledgment frames.

7. A wireless communication system comprising:
    plural wireless communication devices, the wireless communication devices including a wireless communication device on a transmitting side and a plurality of wireless communication devices on a receiving side, the wireless communication device on the transmitting side being capable of transmitting a multicast frame to the plurality of wireless communication devices on the receiving side, wherein
    each receiving side device amongst the plurality of wireless communication devices transmits a beacon frame and acquires information indicative of an order in which the beacon frames are transmitted,
    the wireless communication device on the transmitting side transmits the multicast frame, receiving side devices, amongst the plurality of wireless communication devices on the receiving side and when the multicast frame is received, transmit respective acknowledgment frames in the order in which the beacon frames are transmitted, the acknowledgment frames having been transmitted from the receiving-side devices a predetermined interval after an end of the multicast frame and with the predetermined interval between adjacent acknowledgement frames, and
    the wireless communication device on the transmitting side uses the beacon frame to request the plurality of wireless communication devices on the receiving side to transmit the acknowledgment frame.

* * * * *